United States Patent Office 3,178,890
Patented Apr. 20, 1965

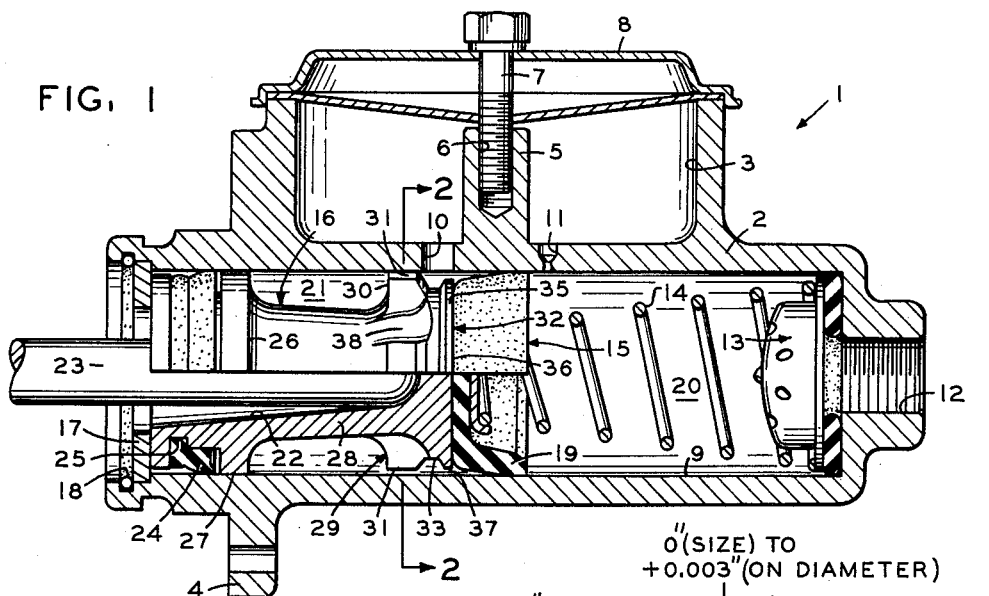

3,178,890
PRESSURE GENERATING MEANS
Eugene E. Wallace, Kirkwood, Mo., assignor to Wagner Electric Corporation, St. Louis, Mo., a corporation of Delaware
Filed Apr. 2, 1962, Ser. No. 184,014
10 Claims. (Cl. 60—54.6)

This invention relates to pressure generating devices and in particular to the pressure generating means therein.

In a past pressure generating device, such as a conventional master cylinder having piston means for moving a sealing member in a bore thereof, manufacturing tolerances of said bore was from "size," i.e., 0.000 inch, to a maximum over "size" of 0.003 inch, and the manufacturing tolerances for a head portion of said piston means was from 0.001 to 0.002 inch on the diameter of said head portion less than "size." In other words, the minimum clearance between the head portion and bore was 0.001 inch and the maximum clearance was 0.005 inch on the diameter of said head portion. In practice it was thought that the maximum clearance was not great enough to provide adequate pressure fluid flow between the head portion and bore for supercharging purposes and that if said maximum clearance was increased, the sealing member would be extruded upon the generation of fluid pressure in said bore. Supercharging is a term commonly used in the industry and art to denote a condition wherein more pressure fluid is displaced into a system than said system would normally hold under static or inoperative conditions to overcome abnormal pedal stroke requirements effected by wear on the system component parts, or the like. Therefore, in order to provide adequate supercharging pressure fluid flow in the prior art devices, six axially drilled passages were provided through the head portion of the piston means, each of which had a cross-sectional area of 0.046 square inch. Consequently, auxiliary devices were necessarily employed in combination with said head portion and/or sealing member to prevent extrusion of said sealing member into the drilled passages in said head portion when the piston means moved said sealing member in a fluid pressure generating direction in said bore.

These auxiliary devices were not only undesirable costwise and assemblywise, but were operationally undesirable. For example, one of the auxiliary devices employed included a metallic butterfly type valve staked to the sealing member seating surface of the head portion and provided with a plurality of radially extending fingers which covered the drilled piston passages in said head portion to obviate sealing member extrusion upon the development of fluid pressure; however, such fingers were subject to metal fatigue and often were disjoined from said valve. The resulting undesirable feature was that subsequent development of fluid pressure extruded the sealing member into the piston passages uncovered by the disjoined fingers engendering sealing member failure, and such disjoined fingers also have severed or punctured the sealing member.

Another example of such auxiliary devices was an annular metallic insert molded into the base of seating surface of the sealing member and positioned to cover the drilled piston passages in the head portion to obviate sealing member extrusion into said passages upon the generation of fluid pressure; however, the sealing member was deformable under repeated fluid pressure development to such an extent that it severed or punctured itself on the annular edges of said insert effecting the undesirable result of sealing member failure. In addition, another undesirable feature was that the insert was subject to expulsion from said sealing member resulting in sealing member extrusion into the uncovered piston passages of the expelled insert upon subsequent generation of fluid pressure.

Another example of such auxiliary devices included a reduced section or annular recess in the base or seating portion of the sealing member in an attempt to prevent sealing member extrusion; however, generated fluid pressure distorted the sealing member to such an extent that extrusion into the uncovered piston passages occurred effecting the undesirable result of sealing cup failure.

An object of the present invention is to provide a pressure generating device in which the above-mentioned undesirable features and results are overcome.

Another object of the present invention is to provide a pressure generating device having a head portion with integral means for providing adequate supercharging pressure fluid flow and preventing sealing member extrusion.

Still another object of the present invention is to provide a pressure generating device having piston means with a head portion and sealing means therefor which obviate the employment of extrusion preventing devices in combination with said head portion and/or sealing means.

And still another object of the present invention is to provide pressure generating means of simple construction and economical manufacture.

These and other objects and advantages will become apparent hereinafter.

Briefly, the invention is embodied in piston means for moving a sealing member in a cylinder to generate fluid pressure, and means integrally formed thereon for preventing sealing member extrusion and providing pressure fluid flow for supercharging purposes between said piston means and cylinder.

The invention also consists in the parts and arrangement and combination of parts hereinafter described and claimed. In the accompanying drawings which form a part of the specification and wherein like numerals refer to like parts wherever they occur:

FIG. 1 is a sectional view of a pressure generating device showing an embodiment of the present invention therein partially in cross-section, FIG. 2 is an enlarged fragmentary view in cross-section taken along line 2—2 of FIG. 1, FIG. 3 is a greatly enlarged partial fragmentary view of the embodiment of the present invention shown in FIG. 1 illustrating the manufacturing tolerances employed in the present invention, FIG. 4 is a fragmentary view showing another embodiment of the present invention partially in cross-section, and FIG. 5 is an enlarged fragmentary view in cross-section taken along line 5—5 of FIG. 4.

Referring now to FIGS. 1, 2 and 3, a pressure generating device or master cylinder 1 is provided with a conventional housing 2 having an integrally formed, atmospheric, pressure fluid reservoir 3 and mounting flange 4 which is adapted for fixed connection with a vehicle firewall or the like (not shown). The housing 2 is provided with an integral post 5 in the reservoir 3 having a threaded bore 6 therein to cooperatively receive a stud 7 which retains a closure member assembly 8 in sealable engagement with the upper extremity of said reservoir.

A bore 9 is provided in the housing 2, and spaced supply and compensating ports 10 and 11 are positioned near the mid-portion of said bore to connect said bore and reservoir 3. An outlet port 12, adapted for connection with a servo motor (not shown), is provided in the rightward end of the bore 9, and a residual pressure check valve and seal assembly 13 is normally biased into sealable engagement with the endwall of the bore 9 about said port by one end of a return spring assembly 14. The other end of the return spring assembly 14 normally biases a primary sealing member or cup 15 into abutment with the rightward end of a piston member 16, and in turn, the force receiving or leftward end of said piston member is normally positioned into abutment with retaining means or stop plate and snap ring assembly 17 fixedly positioned in a cooperating groove 18 in the leftward end of the housing bore 9. The primary sealing member 15 is provided with a flexible sealing lip 19 which is normally in sealing engagement with the sidewall of the bore 9, said sealing member dividing said bore into an expansible pressure chamber 20 and an expansible atmospheric chamber 21.

The piston member 16 is provided with a relatively deep recess 22 in the leftward end thereof to receive an operator actuated push rod 23, and a secondary sealing member 24 is retained in an annular stepped groove 25 adjacent the leftward end of said piston for sealing engagement with the sidewall of the bore 9. An annular land 26 is provided adjacent the groove 25 having a circumferential guide surface 27 thereon for sliding and guiding engagement with the sidewall of the bore 9, and an integral extension 28 protrudes axially therefrom terminating in a piston head portion, indicated generally at 29.

The piston head portion 29 is provided with a plurality of integrally formed, radially extending guide lands 30 having guide surfaces 31 on the peripheral portions thereof for sliding and guiding engagement with the bore 9. The peripheral or guide surface 31 is maintained within the prior art manufacturing tolerances of 0.001 to 0.002 inch less than "size," and the sidewall of the bore 9 is maintained within the prior art manufacturing tolerances from "size," i.e. 0.000 inch, to 0.003 greater than "size"; therefore, the maximum and minimum annular clearances between the peripheral surface 31 and the sidewall of the bore 9 are 0.001 and 0.005 inch, respectively, on the diameter of the land 30 which, of course, corresponds to the prior art. The head portion 29 is provided with an integral extension 32, and an annular groove 33 is provided in said extension between the lands 30 and a land 34 formed adjacent to the rightward end of said extension. The land 34 is provided with a peripheral surface 35, and a radially extending surface 36 is provided on the rightward or free end of the extension 32 intersecting with said peripheral surface 35, said radially extending surface serving as a seat for the sealing cup 15 which is normally biased into abutment therewith by the compressive force of the return spring assembly 14. The peripheral surface 35 of the land 34 is spaced radially inwardly of the peripheral surfaces 31 of the lands 30 between the manufacturing tolerances of 0.004 to 0.005 inch. An annular clearance or passage 37 is formed between the peripheral surface 35 of the land 34 and the sidewall of the bore 9 for pressure fluid supercharging purposes, and the axial projection of said peripheral surface is relatively short in order to reduce the friction drag of pressure fluid thereon when flow is effected through said annular passage for supercharging purposes. A plurality of grooves 38 are provided between the lands 30 and connect with the annular groove 33 to provide substantially unrestricted fluid pressure communication between the annular passage 37 and the expansible atmospheric chamber 21 at all times.

Comprehensive laboratory stroking tests and field tests have determined that the spacing between the peripheral surface 35 of the land 34 and the sidewall of the bore 9 is critical relevant sealing member extrusion and supercharging pressure fluid flow.

In regard to supercharging pressure fluid flow through the annular passage 37, a minimum annular clearance of 0.004 inch on the diameter of the land 34 is provided between the peripheral surface 35 and the sidewall of the bore 9, and if said annular clearance is decreased to an amount less than said minimum, an adequate volume of pressure fluid flow through said annular passage is unobtainable for supercharging purposes. The above-mentioned tests revealed that the preferred annular clearance relevant pressure fluid flow through the annular passage 37 is 0.007 inch, or more, on the diameter of the land 34 which will at all times provide an adequate volume of pressure fluid flow through said annular passage. For comparison sake, the cross-sectional area of the above-mentioned minimum annular clearance between the peripheral surface 35 and the sidewall of the bore 9 is less than the cross-sectional area between prior art piston heads and cylinders plus the six prior art passages provided through the prior art piston heads for supercharging purposes.

In regard to sealing member extrusion into the annular passage 37, a maximum annular clearance of 0.010 inch on the diameter of the land 34 is provided between the peripheral surface 35 and the sidewall of the bore 9. The above-mentioned tests revealed that the preferred annular clearance relevant sealing member extrusion is 0.008 inch, or less, on the diameter of the land 34 and that annular clearances of from 0.008 to 0.010 inch on the diameter of said land effected only negligible traces of sealing member extrusion which did not effect sealing member failure; however, when the annular clearance was increased to an amount in excess of the above-mentioned maximum, damaging extrusion of the sealing member 15 into the annular passage 37 was immediately engendered which quickly resulted in sealing member failure. For comparison sake, the above-mentioned maximum annular clearance of 0.010 inch on the diameter of the land 34 is much greater than the maximum annular clearance of 0.005 inch on the diameter of the prior art piston heads.

The maximum spacing range of the peripheral surface 35 from the sidewall of the bore 9 is between 0.004 inch and 0.010 inch on the diameter of the land 34, which range is defined by the above-mentioned minimum annular clearance of 0.004 inch necessary for effecting adequate pressure fluid flow through the annular passage 37 for supercharging purposes and the aforementioned maximum annular clearance of 0.010 inch for substantially obviating extrusion of the sealing member 15 into the annular passage 37 in response to generated fluid pressure on said sealing member.

In the operation with the component parts of the pressure generating device 1 in the positions previously described, an applied force on the push rod 23 moves the piston member 16 and sealing member 15 rightwardly in the bore 9. Initial movement moves the sealing member 15 past the compensating port 11 interrupting pressure fluid communication between the pressure chamber 20 and the reservoir 3, and the subsqunt movement displaces pressure fluid from said pressure chamber through the check valve assembly 13 and outlet port 12 generating fluid pressure to controllably actuate the servo motor (not shown) connected therewith.

If the operator desires to increase the generated pressure fluid volume by "supercharging" the pressure chamber 20, the applied force is quickly momentarily released from the push rod 23, and the compressive force of the return spring 14 assisted by the pressure differential between the pressure chamber 20 and atmospheric chamber 21 initiates movement of the piston member 16 and sealing member 15 leftwardly in the bore 9. The pressure fluid previously displaced from pressure chamber 20 cannot return thereto at a rate great enough to compensate for this leftward movement; therefore, a partial vacuum is momentarily created in the chamber 20 destroying the aforementioned pressure differential and creating a negative pressure differential across the piston head portion 29 and sealing member 15, i.e., between the atmospheric pressure in chamber 21 and the partial vacuum in chamber 20. The newly created "negative" pressure differential serves to collapse the flexible lip 19 of the sealing member 15 and effects supercharging pressure fluid flow from the chamber 21 through the piston grooves 38, the annular groove 33 and the annular passage 37 and past the collapsed sealing cup lip 19 into chamber 20. In this manner, the supercharging pressure fluid flows into the chamber 20 to substantially equalize the fluid pressure in chambers 20 and 21 before an appreciable amount of the pressure fluid originally displaced from chamber 20 can return; therefore, the chamber 20 is supercharged with an additional volume of pressure fluid when the applied force is re-exerted on the push rod 23 to again displace pressure fluid from the chamber 20 and regenerate fluid pressure therein to actuate the servo motor (not shown), as previously described.

When the applied force on the push rod 23 is released, the pressure differential between chambers 20 and 21 and the compressive force of the return spring 14 moves the piston member 16 and sealing member 15 to their original position and pressure fluid flow is again effected, as previously described, from the chamber 21 through the annular passage 32 and lip 19 of the sealing member 15 into the chamber 20. When the sealing member 15 moves leftwardly past the compensating port 11, pressure fluid communication is re-established between the pressure chamber 20 and the atmospheric reservoir 3, and the volume of supercharged pressure fluid previously injected into said chamber will flow back into said reservoir through said compensation port.

Referring now to FIGS. 4 and 5, a piston member 100 is shown in the bore 9 of the pressure generative device having substantially the same component parts and functioning in the same manner as the previously described piston member 16 with the following exceptions. The piston member 100 is provided with an enlarged head portion, indicated generally at 101, which is provided with an annular land or guide 102 having a peripheral or guide surface 103 in sliding and guiding engagement with the sidewall of the bore 9, and the peripheral or guide surface is maintained within the tolerances of 0.001 to 0.002 inch less than "size"; therefore the maximum and minimum clearances between the guide surface 103 and the sidewall of the bore 9 are 0.001 and 0.005 inch, respectively, on the diameter of the guide land 102. The head portion 101 is provided with an integral extension 104 having a peripheral surface 105, and a radially extending surface 106 is provided on the rightward or free end of said extension intersecting with said peripheral surface 105, said radially extending surface serving as a seat for the sealing cup 15 which is normally biased into abutment therewith by the compressive force of the return spring assembly 14. The peripheral surface 105 is spaced radially inwardly of the guide surface 103 between 0.004 and 0.005 inch, and an annular clearance or passage 107 is formed between said peripheral surface and the sidewall of the bore 9 for pressure fluid supercharging purposes. The maximum clearance or spacing range of the peripheral surface 105 from the sidewall of the bore 9 is between 0.004 inch and 0.010 inch on the diameter of the extension 104, which range is defined by the aforementioned, minimum annular clearance of 0.004 inch necessary for effecting pressure fluid flow through the annular clearance 107 for supercharging purposes and the aforementioned maximum annular clearance of 0.010 inch for substantially obviating extrusion of the sealing member 15 into the annular clearance 107 in response to generated fluid pressure on the sealing member. The axial projection of the peripheral surface 105 is predeterminately short in order to reduce the friction drag of pressure fluid thereon when flow is effected through the annular passage 107 for supercharging purposes. A plurality of grooves 108 are provided in the guide surface 103 of the land 102 and extend across said land in open pressure fluid communication with the annular passage 106.

It is apparent that the peripheral surface 34 on the piston member extensions 32 is predeterminately spaced from the sidewall of the bore 9 to provide an annular clearance 37 therebetween, and the piston member guide lands 30, which contact the sidewall of the bore 9, serve to maintain the above-mentioned predetermined annular clearance 37 substantially constant during the protractile and retractile strokes of the piston member 16 in said bore.

It is also apparent that the peripheral surface 34 on the piston member extension 32 is spaced radially inwardly of the sidewall of the bore 9 between the tolerance range of 0.004 to 0.010 inch on the diameter of said extension, in order to provide adequate "supercharging" pressure fluid flow therebetween upon the retractile stroke of the piston member 16 in the bore 9 and in order to prevent extrusion of the sealing member 15 therebetween upon the protractile, pressure generating stroke of the piston member 16 in the bore 9.

Further, it is also apparent that the passages 38 are integrally formed between the piston member guide lands 30 and that the extension 32 is integrally formed on the piston member 16 to provide a flow path for pressure fluid across the head portion 29 of the piston member 16.

This invention is intended to cover all changes and modifications of the example of the invention herein chosen for purposes of disclosure, which do not constitute departure from the spirit and scope of the invention.

What I claim is:

1. A fluid pressure generating device comprising a cylinder, piston means reciprocally mounted in said cylinder, extension means on one end of said piston means, a sealing cup sealably engaged between said extension means and cylinder in axially spaced relation with said piston means, a predetermined annular clearance between said extension means and cylinder, guide means on said piston means slidably engaged with said cylinder, and passage means in said piston means extending across said guide means and connecting with said annular clearance to provide a path for pressure fluid flow past said piston means and annular clearance to said sealing cup in said cylinder.

2. A fluid pressure generating device comprising a cylinder, piston means reciprocally mounted in said cylinder, extension means on one end of said piston means, a sealing cup sealably engaged between said extension means and cylinder, an axially extending peripheral surface on said extension means spacing said sealing cup from said piston means, an annular clearance between said peripheral surface and cylinder, guide means including a plurality of guide surfaces on said piston means slidably engaged with said cylinder to maintain said annular clearance substantially constant upon protractile and retractile movements of said piston means in said cylinder, and passage means between said guide surfaces and connecting in open pressure fluid communication with said annular clearance, said passage means and annular clearance providing a path for pressure fluid flow across said piston means in said cylinder.

3. A fluid pressure producing device comprising a cylinder having a uniform diameter bore wall, piston means reciprocally mounted in said cylinder and having opposed faces, a first peripheral surface on said piston means interconnecting said opposed faces and in sliding engagement with said cylinder bore wall, a reduced extension on one of said opposed faces, a second peripheral surface on said reduced extension in predetermined radially spaced relation with said cylinder bore wall, a radially extending end surface on said reduced extension intersecting with said second peripheral surface to define the axial extent thereof, a sealing cup having an annular base portion normally engaged with said end surface and an integral sealing lip normally engaged with said cylinder bore wall, an annular chamber defined by the radial clearance between said second peripheral surface and said cylinder bore wall and extending between said one opposed face and said end surface, the sliding engagement between said first peripheral surface and cylinder bore wall serving to maintain the radial clearance of said annular chamber substantially constant upon reciprocation of said piston means in said cylinder, means connected with said piston means for applying a force thereto to effect protractile movement of said piston means and sealing cup and generate fluid pressure in said cylinder, the radial clearance of said annular chamber being small enough to substantially obviate extrusion of said sealing cup into said annular chamber in response to the generated fluid pressure acting on said sealing cup, and groove means in said first peripheral surface between said opposed faces and connecting in open pressure fluid communications with said annular chamber to provide a path for pressure fluid flow past said piston means in said cylinder upon retractile movement of said piston means when the applied force is removed.

4. Piston means comprising a body having an enlarged portion with a first peripheral surface forming a piston guiding member, groove means in said first peripheral surface extending across said enlarged portion and having predetermined fluid passing capacity, extension means on said enlarged portion having a seal carrying surface spaced axially from said groove means, and a second peripheral surface on said extension means spaced radially inwardly of said first peripheral surface.

5. Piston means for a master cylinder comprising a body, a piston head on said body having opposed forward and rear faces, a first peripheral surface on said piston head interconnecting said forward and rear faces forming a piston means guide surface, extension means integrally formed on said forward face and extending axially therefrom, a second peripheral surface on said extension means, said second peripheral surface being axially spaced from said forward face and being spaced radially inwardly of said first peripheral surface, a radially extending free end surface on said extension means intersecting with said second peripheral surface and forming a seal abutment surface, first groove means in said extension means between said forward face and said second peripheral surface, and second groove means in said first peripheral surface extending between said forward and rear faces and connecting with said first groove means.

6. In a fluid pressure generating cylinder including piston means reciprocally mounted in said cylinder, seal means sealably engaged between said piston means and cylinder, the combination therewith comprising extension means on said piston means and in radial end engagement with said sealing means, a peripheral surface on said extension means and spaced not more than 0.010 inch from said cylinder, a guide surface on said piston means in sliding engagement with said cylinder, and passage means in said piston means and extending across said guide surface, said passage means having a greater cumulative pressure fluid transmitting area than the clearance of said extension means with said cylinder, and said passage means being spaced from said seal engaging end of said extension means.

7. In a fluid pressure generating cylinder including piston means reciprocally mounted in said cylinder, seal means sealably engaged between said piston means and cylinder, the combination therewith comprising extension means on said piston means having a radial surface and for engagement with said seal means, a peripheral surface on said extension means, said peripheral surface being concentrically spaced within a range of 0.004 to 0.010 inch of said cylinder, a guide surface on said piston means in sliding engagement with said cylinder to maintain the concentric radially spaced relation between said peripheral surface and cylinder substantially constant, said guide surface being spaced radially inwardly of said cylinder within a range of 0.001 to 0.005 inch, and passage means in said piston means and extending across said guide surface, said passage means being axially spaced from said radial surface of said extension means.

8. The method of providing peripheral pressure fluid compensation past a sealing cup carried on the free end of a piston member during retractile movement of the piston member and sealing cup in a master cylinder and preventing extrusion of said sealing cup relative to the piston member during protractile pressure-developing actuation of the piston member and sealing cup in the master cylinder, comprising the steps of providing piston guiding surfaces on said piston member for slidable contact in said master cylinder, seating the sealing cup in fixed axially spaced relation with said guiding surfaces, forming a predetermined annular clearance contiguous with the sealing cup seat, and providing free pressure fluid access past the piston guiding surfaces to said annular clearance.

9. A master cylinder piston adapted to be slidably mounted in a master cylinder bore, comprising axially spaced first and second head members integrally formed with a reduced coaxial connecting member, each of said head members having a guide portion and a seal carrying portion, the seal carrying portion of said first head member defining the working end of said piston and having a radially disposed, free end, seal seating surface and a relatively narrow circumferential surface, extending axially from said seal seating surface, said guide portion of said first head member being formed adjacent to said sealing carrying portion and having circumferential spaced guide surfaces interrupted by flow passages to provide relatively free pressure fluid flow past said guide portion of said first head member, said circumferential surface of said seal carrying portion having a predetermined radial inset relative to the circumferential guide surfaces of said guide portion to form a peripheral pressure fluid clearance immediately adjacent to said seal seating surface and spacing said guide portion therefrom, and said flow passages being in direct communication with said peripheral clearance.

10. Piston means for a master cylinder comprising a body, an enlarged portion on said body having opposed faces and a first peripheral surface interconnecting said opposed faces, passage means in said enlarged portion between said opposed faces, extension means on said enlarged portion defining the free end of said piston means and having a seal seating surface spaced axially from said passage means, and a second peripheral surface on said extension means between said seal seating surface and said passage means and being spaced radially inwardly of said first peripheral surface.

References Cited by the Examiner

UNITED STATES PATENTS

| 1,830,937 | 11/31 | Falkenstein | 309—51 |
|---|---|---|---|
| 2,059,444 | 11/36 | Dick | 60—54.6 |
| 2,307,642 | 1/43 | Schnell | 60—54.6 |
| 2,561,009 | 7/51 | Byers et al. | 60—54.6 |
| 2,808,703 | 10/57 | Baldwin | 60—54.6 |
| 3,062,601 | 11/62 | Sadler et al. | 309—51 |

FOREIGN PATENTS

| 877,111 | 5/53 | Germany. |
|---|---|---|
| 749,488 | 5/56 | Great Britain. |

JULIUS E. WEST, *Primary Examiner.*

ROBERT R. BUNEVICH, *Examiner.*